July 10, 1945.    R. PATERAS PESCARA    2,380,066
INTERNAL-COMBUSTION ENGINE
Filed April 18, 1942    2 Sheets—Sheet 1
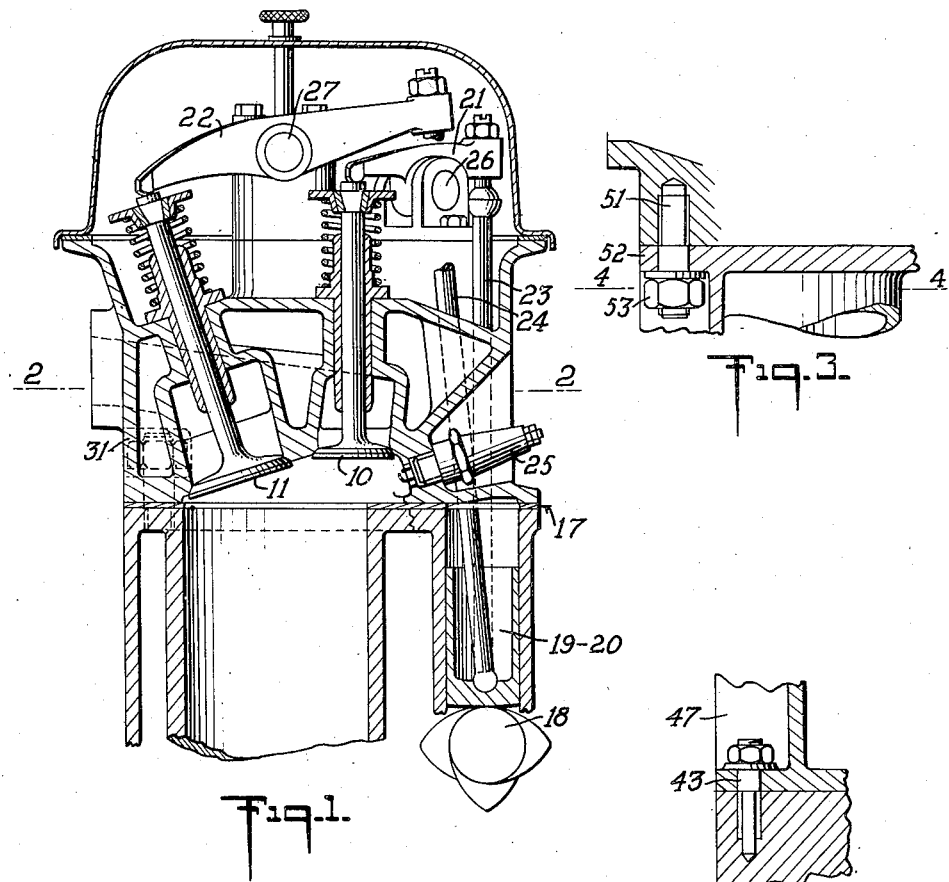
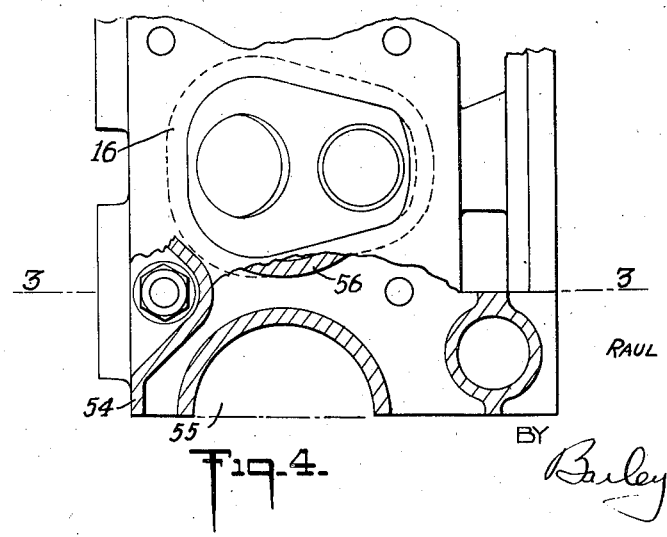
INVENTOR
RAUL PATERAS PESCARA
BY
Bailey, Stephens & Huettig
ATTORNEY July 10, 1945. R. PATERAS PESCARA 2,380,066
INTERNAL-COMBUSTION ENGINE
Filed April 18, 1942 2 Sheets-Sheet 2

INVENTOR
RAUL PATERAS PESCARA
BY
Bailey, Stephens & Huettig
ATTORNEY

Patented July 10, 1945

2,380,066

UNITED STATES PATENT OFFICE 2,380,066

INTERNAL-COMBUSTION ENGINE

Raul Pateras Pescara, Lisbon, Portugal

Application April 18, 1942, Serial No. 439,607
In Spain March 25, 1941

3 Claims. (Cl. 123—52)

My invention relates to internal combustion engines and it refers more particularly to engines of the kind wherein each cylinder head is provided with an inlet valve and with an exhaust valve, the axes of said valves being substantially disposed in one and the same plane transverse with respect to the engine axis.

A first object of my invention is an engine of the kind above-referred to, wherein the inlet and exhaust channels are so disposed that they open on the same lateral face of the cylinder head and preferably on the face opposed to the cam shaft controlling the valves.

A further object of my invention is an engine of the kind above-referred to, wherein housings are provided in the lateral face of the cylinder head beneath the inlet and exhaust channels to accommodate the nuts of those of the cylinder-head securing studs which are disposed below the inlet and exhaust channels.

Still a further object of my invention is an engine of the kind above-referred to, wherein the valves are controlled by a single cam shaft housed in the cylinder block and wherein the motion is transmitted to the valves by means of two pusher rods respectively pushed by the inlet and exhaust cams through two rocker levers pivoted to said rods on the side of the cylinder head which corresponds to the cam shaft and out of the space comprised between the axes of the inlet and exhaust valves.

In the annexed drawings:

Fig. 1 is a transverse section of an engine established in accordance with my invention, the said section being taken along line I—I of Fig. 2.

Fig. 3 is a vertical section along line III—III of Fig. 4, showing a modified form of my invention.

Fig. 4 is a bottom plan view thereof with parts in section along line IV—IV of Fig. 3.

Fig. 5 is a detail cross-section of one of the securing nuts.

Figure 2:
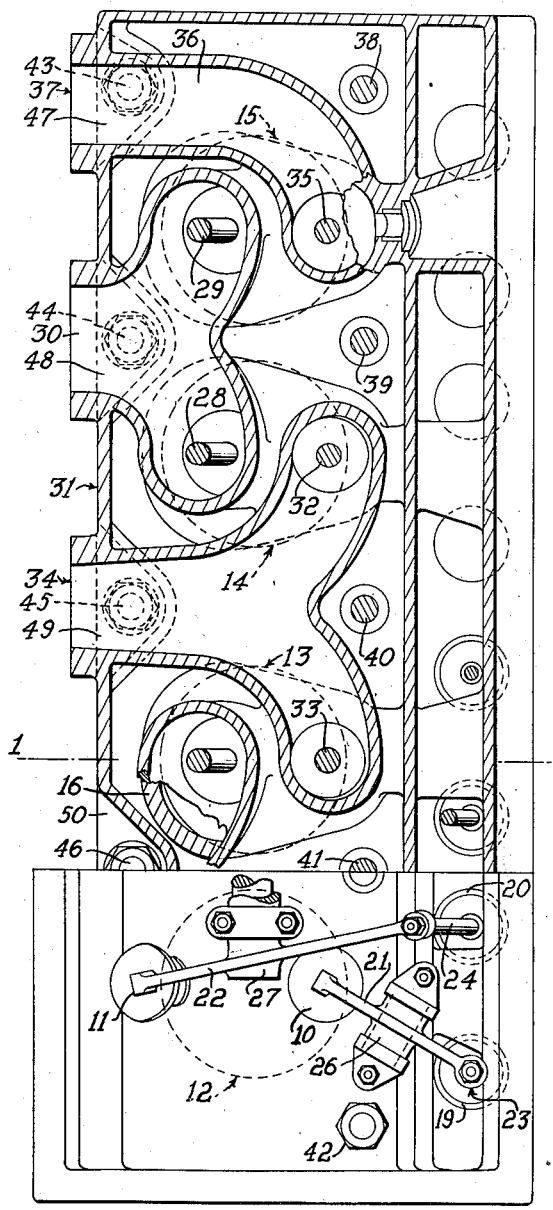
Fig. 2 is a plan view thereof with parts in section along line II—II of Fig. 1.

In Figs. 1 and 2 the engine shown is of the conventional type with four cylinders 12, 13, 14 and 15 in one and the same line. The cylinder heads may be established in any manner by providing above each cylinder a combustion chamber, for instance oval-shaped as shown, having its upper walls formed by two planes at an angle to each other. One of the two faces thus determined is substantially perpendicular to the cylinder axis and it comprises the seat of the exhaust valve 10. The other face is materially oblique with respect to the cylinder axis and it is provided with the inlet valve 11. The combustion chamber is laterally limited by a wall such as 16 of non-uniform height, the maximum being in the vicinity of the exhaust valve 10. The spark plug 25 is preferably disposed in the same zone and in such a manner that its outer end projects laterally from the cylinder head on the side corresponding to the engine cam shaft 18.

The inlet valves, such as 11, are so disposed that the geometrical projection of their seat on the plane of the joint 17 between cylinder head and cylinder is located within the corresponding cylinder such as 12, while the exhaust valves 10 may project beyond the periphery of the cylinder as illustrated. As shown in Figs. 1 and 2 the axes of the two valves of each cylinder are disposed in one and the same transverse plane with respect to the engine axis, which makes it possible to give the seats of said valves much larger diameters than in the known constructions, since the respective valves of two successive cylinders are as remote as possible from each other.

The valves such as 10 and 11 are actuated by a cam shaft 18 disposed within the cylinder block. The cams drive two tappets such as 19 and 20 to which pusher rods 23 and 24 are pivoted. All these parts such as cam shaft 18, tappets 19 and 20, pusher rods 23 and 24 are normally used in many engines of well-known construction.

Rods 23 and 24 actuate the respective valves 10 and 11 through rocker levers 21 and 22. Lever 21 cooperates with exhaust valve 10, the axis of which is parallel with the cylinder axis, and it is fulcrumed at 26, while lever 22 which actuates inlet valve 11, is pivoted, as usual, about a longitudinal pin 27 parallel with the engine axis. Since the arrangement is the same for the four cylinders, the same pin 27 may be used for the four inlet valves.

It will be readily grasped that the valve gear just described with reference to cylinder 12 will be the same for cylinders 13, 14 and 15 and needs no further description.

The articulations which connect rods 23, 24 with levers 21, 22 are thus located on the same side of the cylinder head with respect to cam shaft 18 and they are exterior to the space comprised between the axes of the inlet and exhaust valves.

The internal space of the cylinder head is preferably arranged as follows: The inlet channels are connected by pairs, as shown in Fig. 2 for valves 28 and 29, with a common inlet duct 30 on the wall 31 of the cylinder head opposed to the valve gear 18—19—20—23—24.

The exhaust channels are also arranged to open through the same wall 31 and the channels corresponding to the central pair of exhaust valves 32 and 33 are also connected with a common outlet duct 34. The end valves, such as 35 are however provided with an individual exhaust channel which opens at 37 on the same wall 31.

There is thus obtained an arrangement of ducts identical to the arrangement used in the known constructions wherein the valves are not disposed transversely with respect to the engine axis. The inlet and exhaust pipes of my improved engine are thus of the known type and may comprise the usual pre-heating devices.

The cylinder head thus constructed is fixed to the cylinder block by means of studs such as 38, 39, 40, 41 and 42 screwed up in the cylinder block and passing through the cylinder head, such studs receiving nuts in the usual way. Some studs, however, such as 43, 44, 45 and 46 (Figs. 2 and 5) are so located that their axes intersect an inlet or an exhaust channel. Such studs are made much shorter and their nuts are housed within housings such as 47, 48, 49 and 50 provided in the base of the cylinder head below the inlet and exhaust channels, as shown in Figs. 1 and 2, such housings opening laterally, of course, to permit access to the nuts.

In a modified construction, which is of peculiar advantage with engines specially devised to receive cylinder heads of the kind described, the securing studs such as 51 (Figs. 3 and 4) are fixed to the cylinder head and project downwardly therefrom, the corresponding nuts 53 being disposed beneath the upper edge or flange 52 of the cylinder block and within housings limited by the outer wall 54 of the water jacket, said wall forming a depression between the successive cylinders 55 and 56 (Fig. 4).

When my invention is applied to an existing engine with lateral valves, there is employed a cylinder head substantially as described with reference to Figs. 1 and 2. The pusher rods are articulated at their lower ends in a spherical bearing supported by the valve tappets; they are passed through the passages provided in the block to receive the guiding members for the original lateral valves. It is generally of advantage to remove these guides which are rendered useless.

The joint between the fresh cylinder head and the cylinder block bears on the plane portion existing between the seats of the original valves and the periphery of the cylinders.

My invention permits of obtaining engines of high specific power (power by unit of useful cylinder volume) without requiring a particular and costly construction. In the known engines, besides, the inlet and exhaust nozzles open on opposed sides of the cylinder head and it is thus impossible to provide pre-heating chambers. Moreover in the known engines the fixation of the cylinder head on the cylinder block gives rise to a number of difficulties.

When my invention is applied to existing engines, there is obtained a considerable increase of power; this is of peculiar interest with engines constructed for operation with gasoline or any other fuel of high calorific value, and which have now, under the present conditions, to be fed with producer gas. In this case, my invention permits of obtaining substantially the power originally developed with gasoline or the like.

It will be understood that the above description does not limit my invention the details of which may vary within the ambit of the appending claims.

I claim:

1. In an internal combustion engine, more particularly of the multicylinder type with the cylinders in alinement, a cylinder head with an exhaust channel and an inlet channel provided therein for each engine cylinder, said channels opening on the same side of the cylinder head; an inlet valve and an exhaust valve in said cylinder head to respectively control said inlet and exhaust channels, the axes of said valves being disposed in one and the same plane substantially transverse to the engine axis; and means to actuate said valves, said exhaust channels of the successive cylinders being grouped by pairs with the exception of the exhaust channels corresponding to the extreme cylinders of the engine line.

2. In an internal combustion engine of the character described a cylinder block; a cylinder head on said block, said cylinder head having inlet and exhaust channels; transversely spaced valves in said head to control said channels; a cam shaft to control said valves; rods actuated by said cam shaft; and rocker levers actuated by said rods and actuating said valves, said rocker levers and said rods being exterior to the space defined by the axes of the valves corresponding to each engine cylinder.

3. In an internal combustion engine as claimed in claim 2, one rocker lever for each cylinder having its pivot axis oblique with respect to the engine axis, while the other rocker lever has its pivot axis parallel to said engine axis.

RAUL PATERAS PESCARA.